Dec. 16, 1930.  W. F. EDLIN  1,785,438
NURSING BOTTLE HEATER
Filed Nov. 19, 1929  2 Sheets-Sheet 1
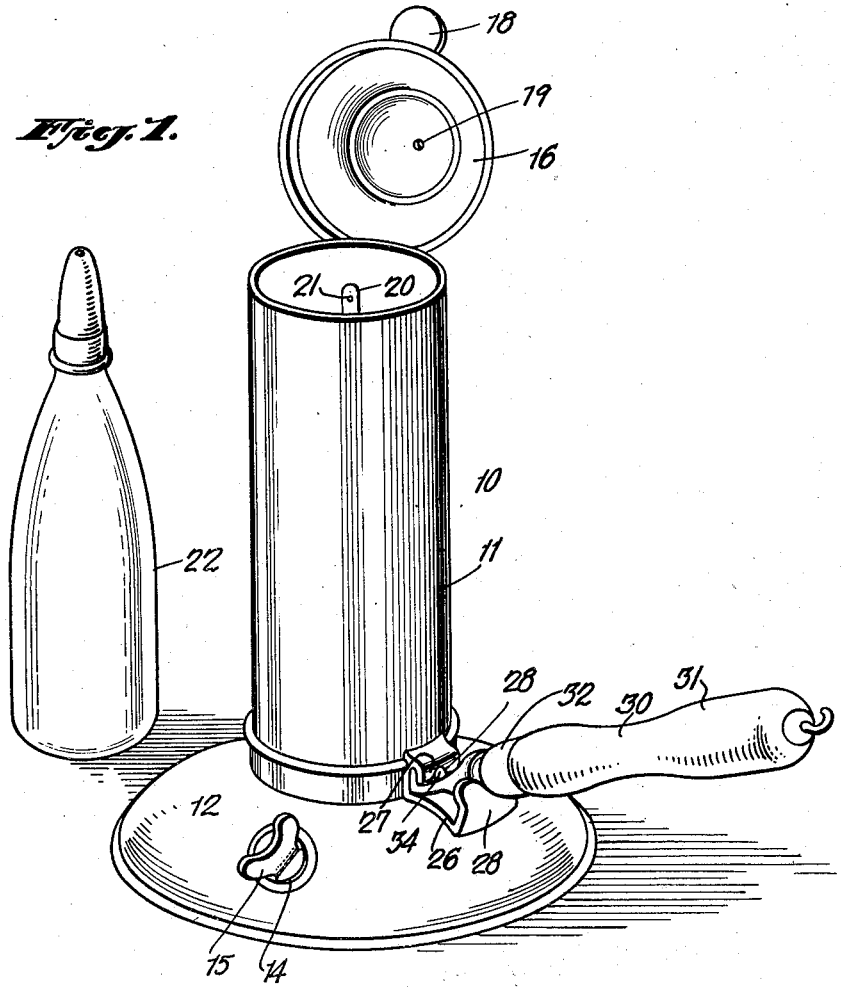
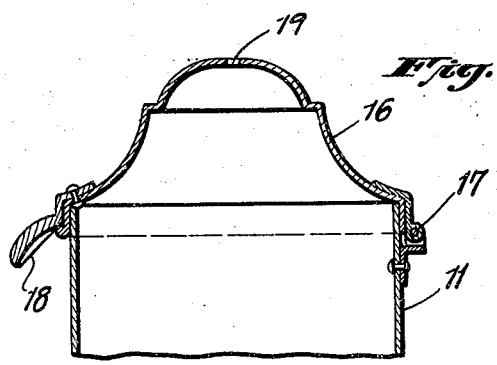
Inventor
WALTER F. EDLIN.
By Clarence A. O'Brien
Attorney Dec. 16, 1930.  W. F. EDLIN  1,785,438
NURSING BOTTLE HEATER
Filed Nov. 19, 1929   2 Sheets-Sheet 2
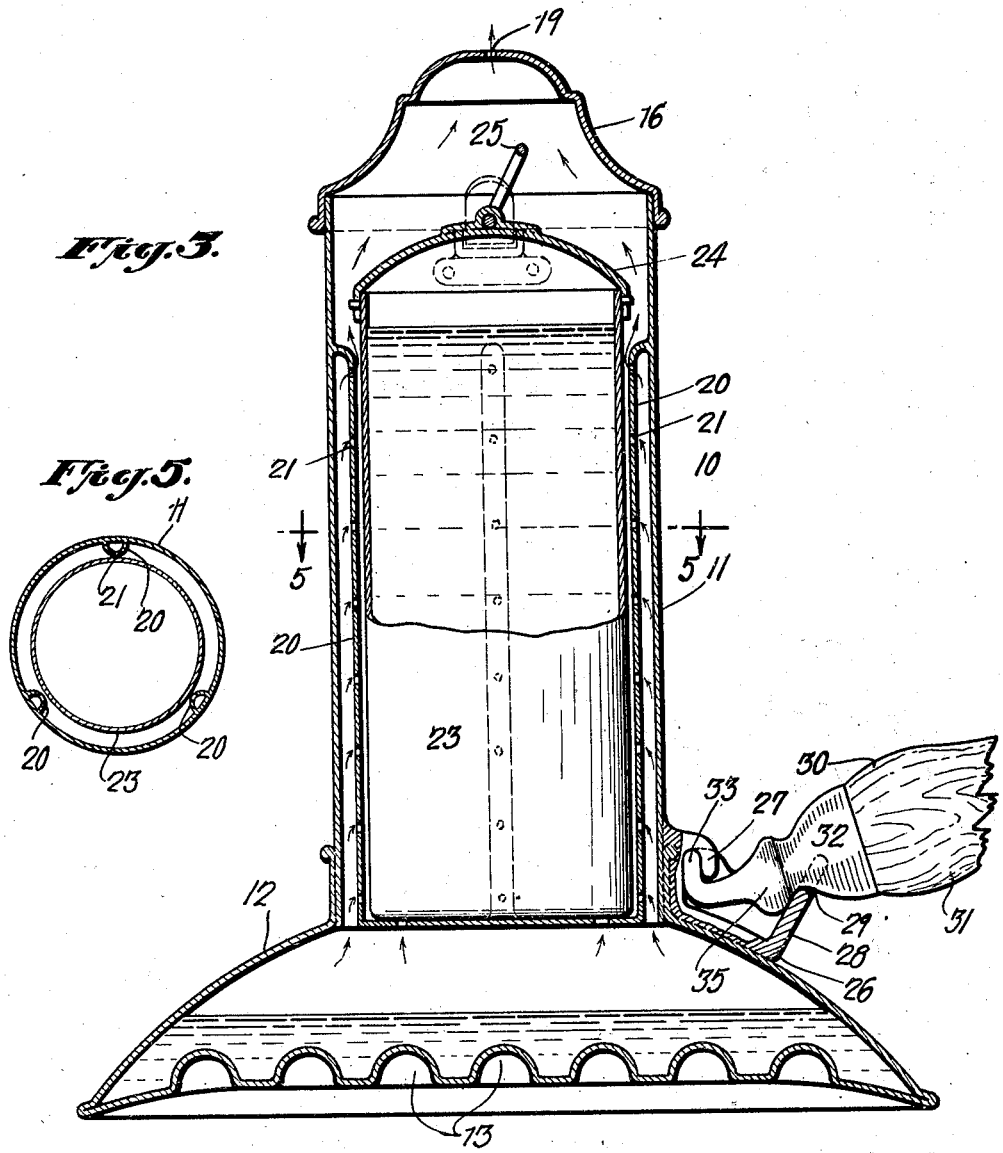
Inventor
WALTER F. EDLIN.
By Clarence A. O'Brien
Attorney Patented Dec. 16, 1930

1,785,438

UNITED STATES PATENT OFFICE

WALTER F. EDLIN, OF UNION CITY, NEW JERSEY

NURSING-BOTTLE HEATER

Application filed November 19, 1929. Serial No. 408,303.

This invention relates to improvements in food heaters and has particular reference to a device for heating milk in nursing bottles.

Heretofore, it has been customary when heating nursing bottles containing milk for the consumption of infants, to fill the nursing bottles with the milk or milk formula and to preserve the same on ice until ready for use, at which time it has been the practice to place the bottle in a pan of water which is placed upon the stove and heated by the water and rising steam therefrom. This practice requires a loss of time which is overcome by the use of my invention wherein the bottle to be heated is placed in a cylindrical vessel having a water chamber beneath the bottom thereof, the water contained therein being capable of rapid heating to produce steam which is exhausted through the side walls of the vessel adjacent the walls of the bottle to quickly heat the contents thereof. The device may be termed a heating utensil in which a supply of water may be kept at all times for instant use.

Another object of the invention is to provide a bottle heater which is simple in construction, rapid in its action, easy of handling, and attractive in appearance.

With these and other objects in view, the invention resides in a certain novel construction, combination and arrangement of parts, the essential features of which are hereinafter and fully described, are particularly pointed out in the appended claim, and are illustrated in the accompanying drawing, in which, Figure 1 is a perspective view of my heating device with the cover in an open position.

Figure 2 is an enlarged vertical sectional view through the upper portion of the device.

Figure 3 is an enlarged vertical longitudinal sectional view through the heating device.

Figure 4 is a fragmentary bottom plan view.

Figure 5 is a horizontal sectional view on the line 5—5 of Figure 3.

Referring to the drawings by reference characters, the numeral 10 designates my improved nursing bottle heater in its entirety and which includes a cylindrical body 11 open at its top and which is supported upon an enlarged hollow dome shaped base 12, the underside of the base being concaved and provided with a series of indentations 13 to increase the heating area of the underside of the base for rapidly heating water adapted to be placed in the hollow base through a filling opening 14 normally closed by a screw plug 15. The interior of the hollow base 12 constitutes a water chamber while the space above the water level within the water chamber may be termed a steam compartment for a purpose which will presently be described. The top of the cylindrical body 10 is closed by a dome shaped lid or cover 16, hinged thereto as at 17, and provided with an extending manipulating fingerpiece 18 diametrically opposite the hinge 17, whereby the said cover may be swung to an open position as shown in Figure 2 of the drawing for facilitating the insertion of a nursing bottle or container into the body for heating the contents thereof. The top of the dome shaped cover 16 is provided with a vent opening 19 for the relief of steam pressure within the body during a heating operation.

Rising vertically within the body 11 against the side walls thereof are tubes 20, any number of which may be provided and which tubes are closed at their tops while their bottoms open into the hollow base 12 for communication with the interior thereof. The inner side walls of the tubes 20 are provided with openings or perforations 21 whereby steam produced by the heating of the water within the base 12 may rise upwardly through the tubes 20 and escape through the openings or perforations 21 to act upon the side walls of the nursing bottle 22 or a container 23 when the same are placed individually into the body 11 for heating. Although the device is primarily intended for heating nursing bottles 22 of the kind shown in Figure 1, the same may also receive a container 23 of the type shown in Figure 3, which container is closed by a removable cover 24 provided with a bail or fingerpiece 25 for facilitating the insertion and removal of the container into the cylindrical body. Although it has been mentioned that the device is intended for heating milk, various other liquid foods may be placed in the container 23 for heating by the steam acting against the walls of the container in the manner hereintofore mentioned.

For facilitating the handling of the heating device, I provide a bracket 26 which is mounted upon the base 12 adjacent the side wall of the body and which bracket includes a downturned hook 27, and an upstanding wall 28 provided with a curved seat 29. The downturned hook 27 is notched as at 28 for a purpose now to be described. Associated with the bracket 26 is a handle member 30 which includes a wooden hand grip 31, one end of which carries a head 32, the free end of said head terminating in an upturned hook 33, for engagement with the downturned hook 27 and which hook 33 is provided with a lug 34 for seating engagement in the notch 28 to prevent lateral shifting of the handle member when in use. The head 32 is also provided with an enlargement 35 which engages behind the wall 28 while the head or body 32 seats upon the seat 29 provided on the said wall.

It will be seen that I have provided a detachable handle member which may be fixedly engaged with the heating device for facilitating the lifting of the same when hot to prevent burning of the hands of the operator. When the device is in position upon the burner on the stove, the handle member 30 may be removed so that the same may be kept in a cool condition at all times.

In use, the device is placed upon a stove with the indented bottom of the base directly over the flame whereby the heat from the flame will of course heat the water in the base 12 to a boiling point whereby the steam from the water which accumulates above the water level will rise upwardly through the tubes 20 and pass out of the openings 21 and act against the walls of the bottle or container being heated. By providing a relatively flat base with a large heating surface, the contents of the base may be heated in a short time and the steam therefrom exhausted within the cylindrical body 11 for rapidly heating the contents of the container supported therein.

While I have shown and described what I deem to be the most desirable embodiment of my invention, it will be understood that various changes in construction may be resorted to if desired, and I therefore do not limit myself to the exact details shown nor to anything less than the whole of my invention limited only by the appended claim.

Having thus described my invention, what I claim as new and desire to secure by Letters-Patent, is:

A nursing bottle heater comprising a hollow dome like base, a cylindrical body rising centrally from said base, and being open at its top, a cover closing the open top of said body, spaced tubes rising upward from the bottom of said cylindrical body, and opening directly into the interior of said dome like base, said tubes extending inwardly from the side walls of the body for spacing a container adapted to be placed therein in spaced relation to the walls of said body, and said tubes having perforations therein, and means on said base for facilitating the filling of the same with water, substantially as and for the purpose specified.

In testimony whereof I affix my signature.

WALTER F. EDLIN.